Patented Jan. 5, 1937

2,066,967

UNITED STATES PATENT OFFICE 2,066,967

DYES OF THE CYANINE SERIES

Walter Dieterle and Walter Zeh, Dessau in Anhalt, and Werner Zerweck, Frankfort-on-the-Main-Fechenheim, Germany, assignors to Agfa Ansco Corporation, Binghamton, N. Y., a corporation of New York No Drawing. Application March 10, 1933, Serial No. 660,286. In Germany February 7, 1931

4 Claims. (Cl. 260—44)

Our present invention relates to dyestuffs and more particularly to dyestuffs of the polymethine series. It is a continuation-in-part of our application Serial Number 590,940 filed Feb. 4, 1932.

One of its objects comprises such dyestuffs. Further objects will be seen from the detailed specification following hereafter.

We have found that cyanines having introduced in their molecule an amino group and corresponding to the general formula

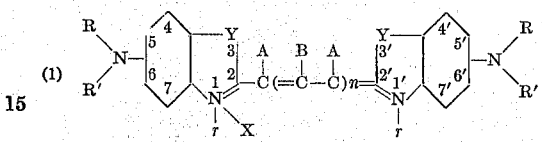

Y=S, Se
B=H, alkyl
r=alkyl
R=H, alkyl, aryl, acyl
A and R'=H, alkyl
n=0 or 1.
X=halide, perchlorate, para-toluene sulfonate, nitrate, are particularly suited for sensitizing photographic emulsions. The dyes are characterized by their sensitizing efficiency and their stability against agents used for stabilizing the emulsions, for instance, potassium bromide.

The amino group having the radicals R and R' may be introduced in the positions 4, 5, 6 or 7, the 5 and 6 position being preferred. There may further be present in the benzene nucleus monovalent radicals, e. g. alkyl, alkoxy in any possible position. The nomenclature employed in the description has the advantage of clearness. In the case of the dyes, numbering is begun from the N atom of the 5 ring and in the case of the bases numbering is begun from Y of the 5 ring.

If, in Formula 1 the index $n$ is 0 there results the following formula

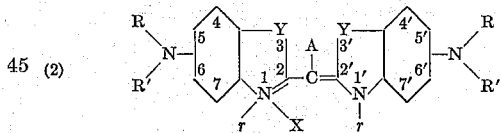

The dyes corresponding to this formula are cyanines.

If, in Formula 1 the index $n$ is 1 there results the following formula

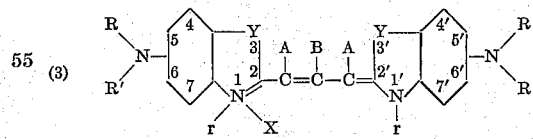

and the dyes corresponding to this formula are carbocyanines.

In the formula of the cyanines the amino group may take the places 4, 5, 6 and 7 and 4', 5', 6' and 7' correspondingly Y may be S or Se. R may represent H, or alkyl, for instance, methyl, ethyl, or aryl, for instance, phenyl, naphthyl, or a substituted aryl, or acyl, for instance, benzyl, acetyl and propionyl. R' may be alkyl in the case of R being alkyl, or aryl, or R' is hydrogen in the case of R being acyl. X may represent any suitable anion that will precipitate the dye, for instance, a halide, paratoluene sulfonate, alkylosulfate, perchlorate, nitrate, or the like. A of Formula 2 may be H or alkyl, like methyl or ethyl for the cyanines. $r$ represents, for instance, H or an alkyl radical, such as methyl or ethyl.

The carbocyanines (cf. Formula 3) may be substituted in the manner indicated for the cyanines, however, in the molecule of these compounds the carbon bridge likewise may be substituted. A represents, for instance, H or alkyl, such as methyl or ethyl, B may be H or an alkyl radical such as methyl, butyl, isobutyl or capryl or an alkoxy radical, for instance, $OC_2H_5$. We wish to make clear that preferably only either B or A may be replaced by the groups just mentioned, the remaining C atom or atoms being linked to hydrogen.

The benzthiazole or benzselenazole nucleus may contain besides the amino group one or several alkyl groups such as methyl or ethyl groups, or alkoxy groups, such as methoxy groups or ethoxy groups, or both alkyl and alkoxy groups.

The dyes are obtainable according to the desired solubility in form of the bromide, iodide, perchlorate, etc.

The production of the 4-, 5-, 6-, or 7-amino substituted 2-methyl-benzthiazoles serving as a starting material for preparing the dyes is described in Examples 1 to 9. Other bases than those described in these examples may be produced in an analogous manner. The method of preparing our new dyes from the bases is analogous to known methods and illustrated in Examples 10 to 18.

*Example 1.*—The preparation of 2-methyl-6-amino-benzo-thiazole corresponding to the formula

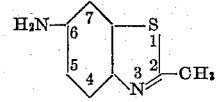

is described in U. S. Patent 1,758,385 and reference is made thereto.

*Example 2.*—The base 2-methyl-5-amino-benzothiazole corresponding to the formula

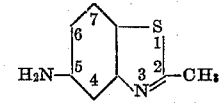

is obtained by reducing the corresponding nitro compound whose method of preparation is known (cf. Friese, Ann. 454, page 177), for instance, with iron and acetic acid. The amino compound is easily soluble in alcohol, glacial acetic acid and benzene. It can be easily recrystallized from water or benzene and forms colorless crystals which melt at about 103° C.

*Example 3.*—The base 2,6-dimethyl-5-aminobenzothiazole corresponding to the formula

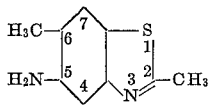

can be obtained in two ways.

According to the first way we proceed as follows: 2-amino-4-acetylamino-toluol corresponding to the formula

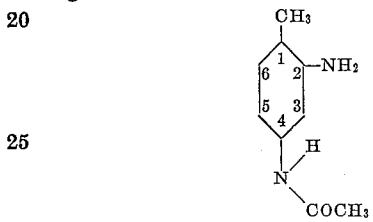

is first rhodanated with NH4SCN and Br in its methyl-alcoholic solution in the manner described in U. S. Patent 1,787,315 and then with an aqueous ammoniacal solution. The formed product, probably the 2,5-diamino-6-methyl-benzothiazole corresponding to the formula

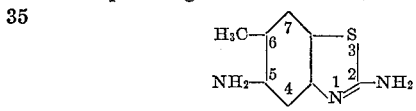

obtained from its aqueous solution in form of colorless crystals which melt at about 200° C. is split up by heating the same with an aqueous solution of caustic potassium of about 50 per cent strength in the manner described in U. S. Patent 1,788,297 in a compound corresponding to the formula

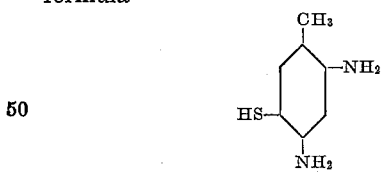

The zinc mercaptide of this compound is transformed into the 2,6-dimethyl-5-acetylaminobenzothiazole with a melting point of about 178° C. corresponding to the above formula by heating the aforesaid mercaptide with acetic anhydride.

According to the second way 3-chloro-4-acetylamino-6-nitrotoluene having a melting point of 143° C. is transformed into 2,6-dimethyl-5-nitrobenzothiazole forming compact, colorless crystals when crystallized from alcohol which melt at about 106° C. This compound yields the 2,6-dimethyl-5-amino-benzothiazole when reduced with iron and acetic acid, forming colorless crystals which melt at about 143° C. The thiazole can be easily acetylated.

*Example 4.*—The base 2,4-dimethyl-6-aminobenzothiazole corresponding to the formula

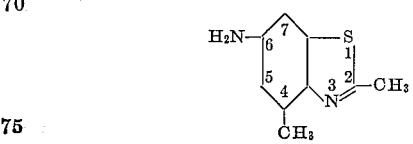

is obtained as follows. Acetyl-toluylene-diamine corresponding to the formula

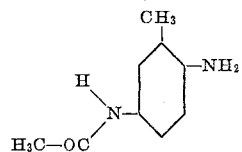

is by means of S2Cl2 transformed into the thiazthionium-compound in the manner described in U. S. Patent 1,637,023. When treating this compound with a solution of caustic alkali according to U. S. Patent 1,243,710 the corresponding o-amino-mercaptan corresponding to the formula

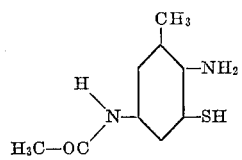

is obtained. By heating this compound with acetic anhydride it is transformed into 2,4-dimethyl - 6 - acetyl-amino-benzothiazole which crystallizes from its aqueous solution in form of colorless crystals melting at about 177° C. By saponification with hydrochloric acid results the 2.4-dimethyl-6-amino-benzothiazole which forms colorless crystals melting at about 118° C.

*Example 5.*—The base 2,4,6-trimethyl-7-aminobenzothiazole corresponding to the formula

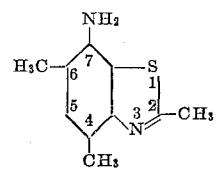

is obtainable as follows. Amino-acetylaminoxylidin corresponding to the formula

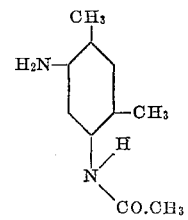

is rhodanated according to U. S. Patent 1,787,315 whereby 2 - amino - 4,6-dimethyl-7-acetylaminobenzothiazole corresponding to the formula

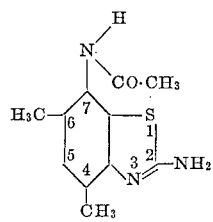

and melting at about 285° C. is obtained. By boiling this compound with a strong aqueous solution of caustic alkali according to U. S. Patent 1,788,297 it is split up to the corresponding o-amino-mercaptan, which may be separated from the reaction mixture in form of the zinc mercaptide. By heating with acetic anhydride the 2,4,6-trimethyl-7-acetylamino-benzothiazole is obtainable. After recrystallization from its alcoholic solution this compound forms colorless crystals melting at about 208° C. By saponification with hydrochloric acid the 2,4,6-trimethyl-7-amino-benzothiazole is obtainable in form of colorless crystals melting at about 128° C.

Example 6.—The base 2-methyl-6-dimethyl-amino-benzothiazole corresponding to the formula

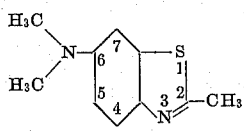

has already been described; cf. Bernthsen, Ann. 251, page 29.

Example 7.—The base 2-methyl-6-diethyl-amino-benzothiazole corresponding to the formula

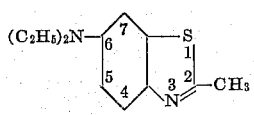

is obtainable analogous to the preparation of the dimethyl compound (cf. Example 1). The chloride forming colorless crystals is easily soluble in water and decomposes when heated to a temperature of about 160° C. under strong evolution of gas. If the base is set free from the chloride by means of an aqueous solution of caustic alkali it separates in form of a yellow oil which solidifies when cooling.

Example 8.—The base 2-methyl-5-dimethyl-amino-benzothiazole corresponding to the formula

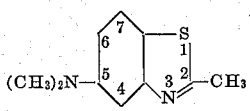

is obtainable as follows: p-bromo-dimethylaniline is nitrated in a mixture of concentrated nitric and sulfuric acid. The formed p-bromo-nitro-dimethylaniline (orange crystals) is converted into p,p'-tetramethyl-diamino-o,o'-dinitrodiphenyl-disulfide (red crystals when crystallized from chlorobenzene) by heating it with the calculated quantity of $Na_2S_2$. From this compound results p-dimethyl-amino-o-amino-thiophenol by reduction with sodium sulfide in an aqueous alkaline suspension. The latter compound is transformed into 2-methyl-5-dimethyl-amino-benzothiazole by a treatment with acetic anhydride. The chloride forms colorless crystals which are insoluble in ether, but easily soluble in water.

Example 9.—The base 2,4-dimethyl-6-phenylamino-benzothiazole corresponding to the formula

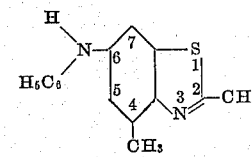

is obtainable by heating 2-amino-3-methyl-5-phenylamino-thiophenol-zinc (cf. U. S. Patent 1,588,384) with acetic anhydride. After crystallization of the compound from benzene it forms colorless crystals which melt at about 138° C. and are easily soluble in benzene, alcohol and glacial acetic acid.

Example 10.—For producing the dye 1,1'-diethyl-6,6'-bisdiethyl-amino-β-methyl-benzothiocarbocyanine-iodide corresponding to the formula

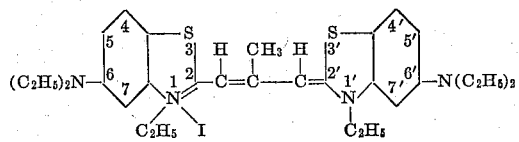

10 grams of 2-methyl-5-diethylamino-benzothiazole-ethyl-iodide of the formula

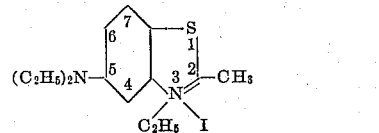

in 20 cc. of dry pyridine are boiled for 1 hour with 10 cc. of ethyl-ortho-acetate. After cooling the dye is precipitated from the dark-violet-blue solution in pyridine by addition of water. From the solution in alcohol, green crystals having the form of needles are obtainable.

The dye is easily soluble in alcohol, the blue alcoholic solution shows an absorption maximum at a wave length of about 598 μμ.

Example 11.—For producing the dye 1,1'-diethyl-6,6'-bis-diethylamino-β-ethylbenzothiocarbocyanine-perchlorate corresponding to the formula

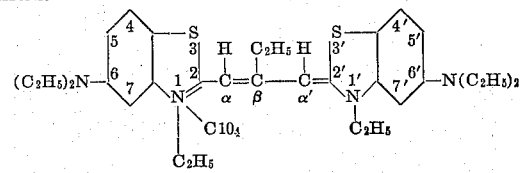

10 grams of 2-methyl-5-diethylamino-benzothiazole-ethyl-iodide dissolved in 20 cc. of pyridine are boiled for about 1 hour with 10 cc. of ethyl ortho-proprionate. After cooling the dye is precipitated from the blue pyridine solution with the aid of an aqueous solution of sodium perchlorate of about 5 per cent strength. The dye is then separated by filtration and washed with water. Recrystallized from its solution in alcohol the dye forms a dark green crystal powder.

The light-blue solution of the dye in alcohol shows an absorption maximum at a wave length of about 610 μμ.

Example 12.—For producing the dye 1,1'-diethyl-5,5'-dimethyl-6,6'-bisdiethylamino-β-methyl-benzothiocarbocyanine-iodide corresponding to the formula

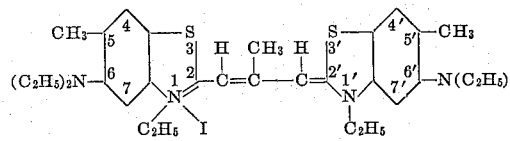

10 grams of 2,6-dimethyl-5-diethylamino-benzothiazole-ethyl-iodide dissolved in 20 cc. of pyridine are boiled for about one hour with 10 cc. of ethyl-ortho-acetate, then the dye is precipitated by addition of a small quantity of an aqueous solution of potassium iodide of about 5 per cent strength, the dye is separated by filtration and washed with water. From its solution in alcohol the dye is obtained in dark green crystals.

The blue solution of the dye in alcohol shows an absorption maximum at a wave length of about 600 μμ.

Example 13.—The dye 1,1'-diethyl-5,5'-bisdiethyl-amino - β - methyl-benzothiocarbocyanine-perchlorate corresponding to the formula

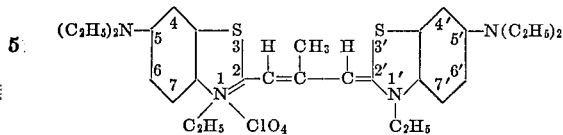

is obtained by condensation of 5 grams of 6-diethyl-amino-2-methyl-benzothiazole-ethyl-iodide dissolved in 10 cc. of pyridine with 5 cc. of ethyl ortho-acetate while heating for about ½ hour to 140° C. The dye is precipitated from the resulting mixture with the aid of an aqueous solution of sodium perchlorate of about 5 per cent strength. From its solution in alcohol the dye is obtained in form of green needles.

The blue solution of the dye in alcohol shows an absorption maximum at a wave length of about 610μμ.

Example 14.—For producing the dye 1,1'-dimethyl-5,5'-bisacetylamino-benzthiocyanine-iodide corresponding to the formula

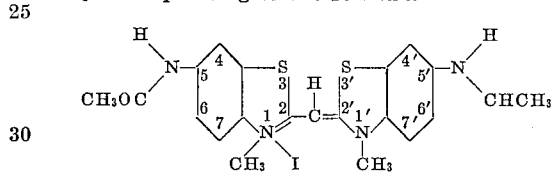

3 grams of 2-methyl-6-acetylamino-benzothiazole-methyl-iodide are heated with 25 cc. of acetic anhydride until the solution is boiling, whereupon 1 cc. of isoamylnitrite is added. While the reaction mixture is vehemently frothing the formed dye separates in form of yellow flakes, which are filtered, washed with acetone and warmed water, and recrystallized from methanol.

The solution of the dye in methanol has a lemon yellow color and shows an absorption maximum at a wave length of about 445 μμ.

Example 15.—The dye 1,1'-diethyl-5,5'-bisdiethyl-amino-benzothiocarbocyanine-iodide corresponding to the formula

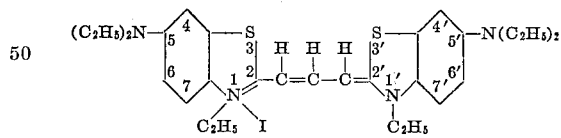

is obtained by boiling for about two hours a mixture of 10 grams of 2-methyl-6-diethylamino-benzothiazole-ethyl-iodide, 20 cc. of pyridine and 10 cc. of ethyl ortho-formate. On addition of a small quantity of a solution of potassium iodide of about 5 per cent strength to the cooled reaction mixture the dye is precipitated in form of green needles. After the dye has been recrystallized from alcohol the alcoholic solution of the dye shows an absorption maximum at a wave length of about 625 μμ.

The dye 1,1'-diethyl-6,6'-bisdiethylamino-benzothiocarbocyanine-iodide corresponding to the formula

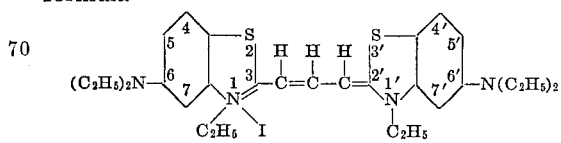

is produced in a completely analogous manner by using 2-methyl-5-diethylamino-benzothiazole-ethyl-iodide instead of 2-methyl-6-diethylamino-benzothiazole-ethyl-iodide.

The dye shows the same absorption maximum at a wave length of about 625 μμ as the 5,5'-bisdiethylamino dye.

Example 16.—For producing the dye 1,1'-dimethyl-5,7,5',7'-tetramethyl-4,4'-diacetylamino-benzothiocarbo-cyanine-bromide corresponding to the formula

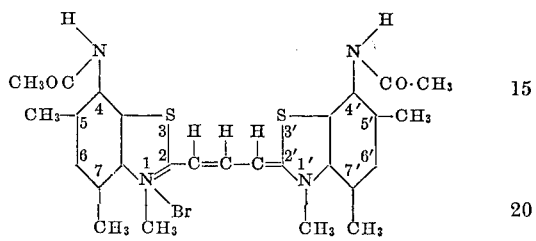

5 grams of 2,4,6-trimethyl-7-acetylamino-benzothiazole-dimethylsulfate, 5 cc. ethyl ortho-formate and 10 cc. of dry pyridine are boiled for about one hour. After cooling the dye is precipitated by addition of a small quantity of a solution of potassium bromide of about 5 per cent strength.

The dye dissolves in alcohol with a red violet color and the solution shows an absorption maximum at a wave length of about 570 μμ.

Example 17.—For producing the dye 1,1'-diethyl-5,5'-bisdiethylamino-benzoselenocarbocyanine-iodide corresponding to the formula

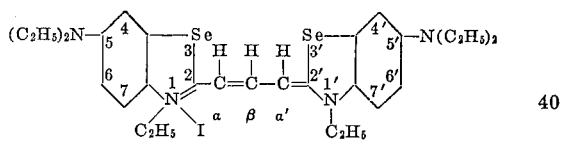

5 grams of 2-methyl-6-diethylaminobenzoselenazole-ethyliodide are dissolved in 10 cc. of hot pyridin and this mixture is boiled for about 1 hour with 5 cc. of ethyl ortho-formate. After cooling the dye is precipitated in the blue pyridine solution by addition of a small quantity of an aqueous solution of potassium iodide of about 5 per cent strength. Then the dye is separated from the mixture by filtration and is after recrystallization from alcohol obtained in form of a black blue crystal powder.

In the alcoholic solution the dye has an absorption maximum at a wave length of about 640μμ.

It is to be understood that our invention is not limited to the foregoing examples nor to the specific details given therein. Numerous other embodiments are possible and we contemplate as included within our invention all such modifications and equivalents as fall within the scope of the appended claims.

The formulae of the dyes given herein represent the molecular structure of our new dyes so far as to our actual knowledge. If, however, in future it should become evident that the formulae do not exactly correspond to the dyes this fact will not affect our invention since the dyes will be easily identified by the method of producing the same which has been fully described in the examples.

What we claim is:

1. A carbocyanine salt containing in its molecule two equal amino substituted nuclei selected from the group consisting of the benzo thiazole nucleus and the benzo selenazole nucleus linked together by a trimethenyl chain linking the nuclei in 2 and 2' position.

2. A dye corresponding with the formula

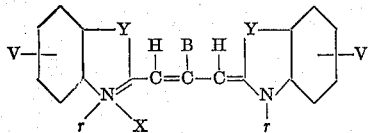

Y = A member of the group consisting of S and Se.
B = A member of the group consisting of H and alkyl.
r = Alkyl.
V = A member of the group consisting of an amino group, a dialkylamino group and an amino group substituted by the radical of a lower fatty acid.
X = A member of the group consisting of halide, perchlorate, paratoluene sulfonate and nitrate radicals, Y, V, r, and X being the same radical in both nuclei.

3. The dye 1,1'-diethyl-5,5'-bisdiethylamino-β-methyl-benzothiocarbocyanine perchlorate corresponding with the formula

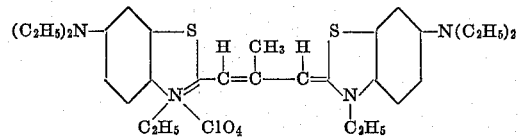

having an absorption maximum at about 610 μμ.

4. The dye 1,1'-diethyl-5,5'-bisdiethylamino-benzo-selenocarbocyanine iodide corresponding with the formula

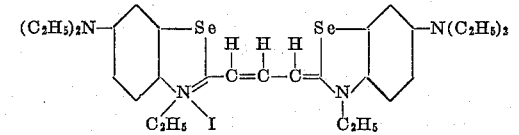

having an absorption maximum at about 640 μμ.

WALTER DIETERLE.
WALTER ZEH.
WERNER ZERWECK.